United States Patent [19]

Yagi et al.

[11] Patent Number: 5,169,902
[45] Date of Patent: Dec. 8, 1992

[54] VIBRATION-PROOF DAMPING POLYMER MATERIAL

[75] Inventors: Toshiharu Yagi; Yoshito Tanaka; Tsuyoshi Noguchi; Kohsaku Sakaguchi; Nobuhiko Tsuda, all of Settsu, Japan

[73] Assignee: Daikin Industries Ltd., Osaka, Japan

[21] Appl. No.: 501,930

[22] Filed: Mar. 30, 1990

[30] Foreign Application Priority Data

| Mar. 31, 1989 | [JP] | Japan | 1-81683 |
| Mar. 31, 1989 | [JP] | Japan | 1-81684 |
| Mar. 31, 1989 | [JP] | Japan | 1-81685 |
| Mar. 31, 1989 | [JP] | Japan | 1-81686 |
| Mar. 31, 1989 | [JP] | Japan | 1-81687 |
| Mar. 31, 1989 | [JP] | Japan | 1-81688 |
| Mar. 31, 1989 | [JP] | Japan | 1-81689 |

[51] Int. Cl.$^5$ .................. C08F 259/08; C08L 27/18; C08L 27/12
[52] U.S. Cl. .................. 525/301; 525/276; 525/199; 525/903
[58] Field of Search .............. 525/199, 276, 301, 903

[56] References Cited

U.S. PATENT DOCUMENTS

| 3,257,334 | 6/1966 | Chen et al. | 525/276 |
| 3,644,577 | 2/1972 | Lee et al. | 525/276 |
| 3,790,645 | 2/1974 | Murayama et al. | 525/276 |
| 4,877,839 | 10/1989 | Conti-Ramsdev et al. | 525/276 |

FOREIGN PATENT DOCUMENTS

| 0332141 | 9/1989 | European Pat. Off. | 525/276 |
| 0358195 | 3/1990 | European Pat. Off. | 525/276 |
| 385443 | 9/1990 | European Pat. Off. | 525/276 |
| 2228377 | 9/1990 | European Pat. Off. | 55/276 |

*Primary Examiner*—James J. Seidleck
*Assistant Examiner*—W. R. H. Clark
*Attorney, Agent, or Firm*—Nikaido, Marmelstein, Murray & Oram

[57] ABSTRACT

A vibration-proof damping polymer material characterized in that the material is prepared from a polymer substance obtained by dissolving an amorphous fluorine-containing polymer in an acrylic monomer and polymerizing the monomer with or without permitting the resulting polymer to form an interpenetrating polymer network, and a vibration-proof damping polymer material characterized in that the material is prepared from a blend of (a) and (b), (a) being an amorphous fluorine-containing polymer or crystalline polymer containing vinylidene fluoride, and (b) being an acrylic polymer.

4 Claims, No Drawings

VIBRATION-PROOF DAMPING POLYMER MATERIAL

The present invention relates to vibration-proof damping polymer materials.

Conventionally, structural members of rolling stock, ships, automotive parts, apparatus, machines, building materials, acoustic materials, etc. are prevented from vibration on the rear side thereof and from producing noise due to vibration by giving an increased thickness to the member, improving the device or material itself or using damping materials. Various damping materials have heretofore been proposed. For example, materials are well known which are prepared by admixing rubber, resin or asphalt with an inorganic filler such as graphite, carbon black, mica, asbestos, calcium carbonate, talc or metal powder. Damping materials primarily incorporating asbestos have an effect to prevent noise due to vibration, i.e., a damping effect, whereas they are deficient in an effect to prevent acoustic radiation, i.e., in noise insulating property, because they are low in specific gravity. On the other hand, noise insulating materials chiefly incorporating a metal powder are deficient in damping effect and therefore unsatisfactory although having a noise insulating property. Further in the case where the noise insulating material is attached directly to machines or devices mentioned above which produce vibration and noise and which are likely to become heated to a temperature as high as 80° to 120° C., the material exhibits a lower damping effect or softens itself to exhibit impaired shape retentivity at high temperatures. Thus, the material is usable for only greatly limited applications.

An object of the present invention is to provide a polymer material which has excellent vibration-proofness, damping property and stability in shape over a wide low to high temperature range.

Another object of the present invention is to provide a vibration-proof damping polymer material which is excellent in workability, transparency, resistance to heat, weather, chemicals, oils, solvents, water and abrasion, water and oil repellency, nonflammability, etc. and which is excellent also in vibration-proof damping characteristics.

The above and other objects of the invention will become apparent from the following description.

The present invention provides a vibration-proof damping polymer material characterized in that the material is prepared from a polymer substance obtained by dissolving an amorphous fluorine-containing polymer in an acrylic monomer, and polymerizing the monomer with or without permitting the resulting polymer to form an interpenetrating polymer network.

The present invention further provides a vibration-proof damping polymer material characterized in that the material is prepared from a blend of (a) and (b), (a) being an amorphous fluorine-containing polymer or crystalline polymer containing vinylidene fluoride, and (b) being an acrylic polymer.

The amorphous fluorine-containing polymers to be used in the present invention are, for example, copolymers containing vinylidene fluoride, fluoroalkene/olefin copolymers, fluoro(alkyl vinyl ether)(including those having multiple ether bonds)/olefin copolymers, fluorosilicon elastomers and fluorophosphazene elastomers. Among some of these polymers, those having an iodine atom or bromine atom bonded to the polymer chain thereof (see, for example, JP-A-53-125491 and JP-A-59-20310, and JP-B-53-4115) are highly amenable to polymerization reaction and are therefore desirable.

In the present invention, the above amorphous copolymer containing vinylidene fluoride is preferably 500 to a million in number average molecular weight and is obtained by copolymerizing vinylidene fluoride with at least one other copolymerizable monomer. Examples of other monomers are tetrafluoroethylene, chlorotrifluoroethylene, trifluoroethylene, vinyl fluoride, hexafluoropropylene, pentafluoropropylene, hexafluoroisobutene, perfluorocyclobutene, perfluoro(methylcyclopropylene), perfuluoroallene, $\alpha$, $\beta$, $\beta$-trifluorostyrene, perfluorostyrene, polyfluoroalkyl vinyl ethers [e.g., perfluoro(methyl vinyl ether), perfluoro(propyl vinyl ether)], polyfluoroacrylic acid or ester thereof, polyfluorovinyl acetic acid or ester thereof, polyfluorovinyl ether sulfonic acid, polyfluorodienes, ethylene, propylene, acrylic acid or ester thereof and vinyl acetic acid or ester thereof. The content of the monomer is not particularly limited but is preferably 10 to 60 wt %. Among some of these polymers, those having an iodine atom or bromine atom bonded to the polymer chain thereof (see, for example, JP-A-53-125491 and JP-A-59-20310, and JP-B-53-4115) are highly amenable to polymerization reaction and are therefore desirable. Further, these copolymers containing vinylidene fluoride may be those crosslinked by a usual manner.

Fluoroalkene/olefin copolymers used in the present invention include a copolymer of tetrafluoroethylene and propylene, and copolymers of the above two components and other copolymerizable monomer. Examples of useful other copolymerizable monomers are vinylidene fluoride, perfluoro(alkyl vinyl ether)[e.g., perfluoro(methyl vinyl ether), perfluoro(propyl vinyl ether)], ethylene, isobutene, 2-chloroethyl vinyl ether, acrylic acid glycidyl vinyl ether and vinyl acetic acid.

Fluoro(alkyl vinyl ether)/olefin copolymers include ethylene/perfluoro(methyl vinyl ether) copolymers, ethylene/perfluoro(propyl vinyl ether) copolymer and ethylene/perfluoro(polyether vinyl ether) copolymer.

Examples of fluorosilicon elastomers are a copolymer of methyltrifluoropropylsiloxane and vinylmethylsiloxane, and examples of fluorophosphazene elastomers are a reaction product of a long-chain elastomer with trifluoroethanol, pentafluoropropanol or heptafluorobutanol, the elastomer being obtained by thermal degradation of dichlorophosphonitrile trimer.

Acrylic monomers useful for the present invention are not limited in kind and include mono- and polyfunctional monomers. The monomer is used singly or in a mixture of at least two of them. The polyfunctional monomer is preferably used in a small amount, conjointly with the monofunctional monomer. Examples of preferred monomers are methyl methacrylate (MMA), ethyl methacrylate (EMA), butyl methacrylate (BMA), 2-hydroxyethyl methacrylate (HEMA), 3-(trimethoxysilyl)propyl methacrylate (MSPM), 2-(phenylphosphoryl)ethyl methacrylate (phenyl-P), 2-hydroxy-3-($\beta$-napthoxy)propyl methacrylate (HNPM), N-phenyl-N-(2-hydroxy-3-methacryloxy)propylglycine (NPG-GMA), ethylene glycol dimethacrylate (EDMA or 1 G), diethylene glycol dimethacrylate (DiEDMA or 2 G), triethylene glycol dimethacrylate (TriEDMA or 3 G), 1,4-butanediol dimethacrylate (1,4-BuDMA), 1,3-butanediol dimethacrylate (1,3-BuDMA), neopentyl glycol dimethacrylate, 1,6-hexanediol dimethacrylate, 2,2-bis[4-(2-hydroxy-3-methacryloxypropoxy)phenyl]-propane (Bis-GMA), 2,2-bis(4-methacryloxyphenyl)propane (BPDMA), 2,2-bis(4-methacryloxyethoxyphenyl)propane (Bis-MEPP), 2,2-bis(4-methacryloxypolyethoxyphenyl)propane (Bis-MPEPP), di(methacryloxyethyl)trimethylhexamethylenediurethane (UDMA), trimethylolpropanetrimethacrylate (TMPT), glycidyl methacrylate, $CH_2=C(CH_3)COOCH_2CF_3(3FMA)$, $CH_2=C(CH_3)COOCH_2CF_2CF_2H(4FMA)$, $CH_2=C(CH_3)COOCH_2CF_2CF_2H(5FMA)$, $CH_2=C(CH_3)COOCH_2(CF_2)_2CF_3(7FMA)$, $CH_2=C(CH_3)COOCH_2(CF_2)_3CF_2H(8FMA)$, acrylates and α-fluoroacrylates corresponding to such compounds.

Examples of α-fluoroacrylates are $CH_2=CFCOOCH_2CF_2CF_2H(4FFA)$, $CH_2=CFCOOCH_2CF_2CF_3(5FFA)$, $CH_2=CFCOOCH_2(CF_2)_3CF_2H(8FFA)$ and $CH_2=CFCOOCH_2(CF_2)_5CF_2H(12FFA)$.

According to the invention, the fluorine-containing polymer is dissolved in such an acrylic monomer, and the solution is then subjected to polymerization, whereby the polymer substance is prepared. The polymerization is conducted in the presence of a polymerization initiator. A polymerization inhibitor, reducing agent, transfer agent, etc. can be added to the polymerization system. Examples of useful polymerization initiators are light, heat, benzoyl peroxide, azoisobutyronitrile (AIBN), camphorquinone (CQ), 9-fluorenone, tributylborane (TBB), benzophenone and the like. Examples of useful reducing agents are dimethylaminoethyl methacrylate (DMAEMA), dimethyl-p-toluidine (DMPT) and the like. Examples of useful polymerization inhibitors are hydroquinone, hydroquinone methyl ester and the like. Examples of useful transfer agents include lauryl mercaptan.

When heat polymerization is resorted to, it is desirable to heat the solution at a temperature of about 40° to about 100° C. for about 10 to about 150 minutes. When to be subjected to photopolymerization, the solution is preferably irradiated with visible rays or ultraviolet rays for several minutes to tens of minutes.

The substances of the present invention include those obtained by forming such a polymer substance into an IPN (interpenetrating polymer network). IPN is a polymer obtained by mixing two linear polymers together each in the form of a liquid (or solution) and crosslinking one or both of the polymers to interlock the respective molecular chains. This method is utilized in the present invention as modified into several different methods. According to a first method, a polymer substance is first made into a film, a monomer serving as a guest polymer is injected in the state of vapor phase into the film, or the film is immersed in a solution of the monomer to inject the monomer into the film, and the film is thereafter polymerized or crosslinked as by heating or irradiation with light. A second method, like the usual IPN forming method, comprises dissolving a polymer substance in a suitable solvent, admixing a guest component with the solution for reaction, casting the resulting solution into a film, and heat-treating the film when so required. Other methods are also usable.

For the formation of IPN, crosslinking must be effected. This can be accomplished, for example, by using as the fluorine-containing polymer such a compound having an iodine atom or bromine atom bonded to the polymer chain thereof, or by using as the acrylic monomer at least bifunctional monomer, or by using a crosslinking agent.

For this purpose, the fluorine-contaning polymers and acrylic monomers already exemplified are usable. Useful crosslinking agents include, for example, triallyl isocyanurate, triallyl cyanurate, triacryl formal, triallyl trimellitate, diallyl phthalate and like poly-unsaturated compounds. Further, an organic peroxide is also usable as a radical source.

The vibration-proof damping polymer material defined in claim 2 of the present invention is described below. The same amorphous fluorine-containing polymer as above is usable. Examples of crystalline polymer containing vinylidene fluoride are a homopolymer and copolymers of vinylidene fluoride. Copolymerizable monomers include tetrafluoroethylene, trifluoroethylene, chlorotrifluoroethylene and trichlorofluoroethylene.

Acrylic polymers include a homopolymer of acrylic monomer and copolymers of acrylic monomer and other monomer. The same acrylic monomer as above is usable. Examples of other monomers are vinyl acetate, styrene, acrylonitrile, butadiene and 2-chloroethyl vinyl ether.

As the above fluorine-containing polymer and acrylic polymer are usable those obtained by a usual method.

The polymer substance for use in the present invention is excellent in processability, transparency, resistance to heat, weather, chemicals, oils, solvents and water, water and oil repellency, abrasion resistance and nonflammability and has outstanding vibration-proof damping characteristics.

The polymer substance is molded in a desired shape, for example, by extrusion, injection molding or compression molding, or is dissolved or dispersed in a suitable solvent to obtain a coating composition, which is then made into a desired shape. The polymer material thus prepared is used for applications mentioned later. Additives for rubbers and plastics may be added to the polymer substances. Examples of such additives are fillers, reinforcing agents, softening agents, plasticizers, compatibility imparting agents, seed of crystallization, antiaging agents, antioxidants, antiozonants, ultraviolet absorbers, pigments, dyes, tackifier resins and the like.

The vibration-proof damping polymer material of the present invention is useful as such for ceilings, floors, side walls, bonnets and the like of vehicles such as motor vehicles, trains, aircraft and ships. The present material is widely usable for building machines, agricultural machines, civil engineering machines and other industrial machines; for noise sources in factories or plants such as metal working machines, ducts, hoppers and chutes; for noise sources in houses and offices such as roofs (especially iron plate roofs), ceilings, floors and walls; for office machines such as calculators and printers; for household electric applicances such as air conditioners, washing machines and vacuum cleaners; for acoustic systems such as stereo sound reproduction systems and record players, pianos, organs and the like.

The present invention will be described below with reference to the following examples.

EXAMPLE 1

In a monomer mixture of 9.9 g of methyl methacrylate (MMA) and 0.1 g of ethylene glycol dimethacrylate (1 G) were dissolved camphorquinone (CQ) and dimethylaminoethyl methacrylate (DMAEMA) each in an amount of 0.5 wt % based on the mixture. Further dissolved in the solution were 20 g of fluoroelastomer (Dai-el ® G801, iodine-containing elastic copolymer containing vinylidene fluoride), and 0.5 wt % of Perhexa 2.5 B (product of Nippon Oils & Fats Co., Ltd., peroxide) and 0.2 wt % of triallyl isocyanurate (TAIC) based on G801 to prepare a uniform solution, which was irradiated with visible rays for photopolymerization. The sample obtained was heat-treated at 160° C. for 10 minutes to crosslink the rubber.

The polymer material obtained was 10.01 HV (25° C.) in Vickers hardness.

For a material to exhibit vibration-proof damping characteristics, the material needs to have characteristics to effectively convert vibration energy to thermal energy for dissipation. As a measure of the ratio of conversion from the vibration energy to the thermal energy, $\tan\delta$ can be mentioned which is obtained by measuring the dynamic modulus in tension. The greater the value of $\tan\delta$, the greater is the conversion ratio. The value $\tan\delta$ and the dynamic modulus in tension E' were measured at a frequency of 3.5 Hz while raising the temperature at a rate of 2° C./min. The results are given in Table 1.

TABLE 1

| Temp. (°C.) | tanδ | E' (dyne/cm$^2$) |
| --- | --- | --- |
| −50 | 0.023 | 2.60 × 10$^{10}$ |
| −25 | 0.027 | 2.20 × 10$^{10}$ |
| 0 | 0.039 | 1.82 × 10$^{10}$ |
| 25 | 0.079 | 1.42 × 10$^{10}$ |
| 50 | 0.49 | 0.47 × 10$^{10}$ |
| 68 | 1.32 | 0.50 × 10$^9$ |
| 75 | 1.18 | 0.47 × 10$^9$ |
| 100 | 0.60 | 0.54 × 10$^9$ |

TEST EXAMPLE 1

A steel panel, 3 mm in thickness, 30 mm in width and 200 mm in length and pretreated with resin and by sandblasting, was coated over the entire surface thereof with the above mixture to a thickness of 3 mm, and the coating was polymerized and crosslinked in the same manner as above. An aluminum sheet, 0.05 mm in thickness, 30 mm in width and 200 mm in length adhered to the resin layer with use of an epoxy adhesive. The adhesive layer was up to 20 μm in thickness. Table 2 shows the result obtained by subjecting the test piece prepared to a modal analysis.

TABLE 2

| Temp. (°C.) | Attenuation constant (%) | Frequency (Hz) |
| --- | --- | --- |
| 60 | 1.08 | 413 |
| 100 | 1.64 | 400 |
| 140 | 1.02 | 387 |

EXAMPLE 2

To G801 were added 4 wt % of TAIC and 1.5 wt % of Perhexa 2.5 B based on the G801, followed by kneading and heat treatment at 160° C. for 10 minutes to obtain crosslinked G801. On the other hand, in MMA were dissolved CQ and DMAEMA each in an amount of 0.5 wt % based on the MMA, and the crosslinked G801 was immersed in the solution for swelling so that the swollen mass contained 55 wt % of the crosslinked G801 and 45 wt % of MMA. The mixture was then subjected to photopolymerization in the same manner as in Example 1.

The tanδ and E' values of the polymer material prepared were measured in the same manner as in Example 1. Table 3 shows the result.

TABLE 3

| Temp. (°C.) | tanδ | E' (dyne/cm$^2$) |
| --- | --- | --- |
| −100 | 0.04 | 3 × 10$^{10}$ |
| −50 | 0.04 | 2.6 × 10$^{10}$ |
| 0 | 0.07 | 1.95 × 10$^{10}$ |
| 50 | 0.09 | 1.2 × 10$^{10}$ |
| 100 | 0.98 | 4.3 × 10$^8$ |
| 105 | 1.1 | 2 × 10$^8$ |
| 150 | 0.4 | 1.2 × 10$^8$ |
| 200 | 0.18 | 1.3 × 10$^8$ |

TEST EXAMPLE 2

A sheet of G801, 2 mm in thickness and crosslinked in the same manner as above, was immersed for swelling in MMA having dissolved therein CQ and DMAEMA each in an amount of 0.5 wt % so that the swollen sheet contained 55 wt % of crosslinked G801 and 45 wt % of MMA. The sheet was then placed on a steel panel of the same size as used in Test Example 1 and subjected to photopolymerization. An aluminum sheet, 0.05 mm in thickness, 30 mm in width and 200 mm in length adhered to the resin layer with use of an epoxy adhesive. The adhesive layer was up to 20 μm in thickness. Table 4 shows the result obtained by subjecting the test piece to a modal analysis.

TABLE 4

| Temp. (°C.) | Attenuation constant (%) | Frequency (Hz) |
| --- | --- | --- |
| 60 | 1.05 | 397 |
| 80 | 1.34 | 390 |
| 100 | 1.26 | 382 |
| 120 | 1.04 | 374 |

EXAMPLE 3

Two parts by weight of Dai-el ® G801 (iodine-containing vinylidene fluoride elastic copolymer) was dissolved in 1 part by weight of methyl methacrylate (MMA), followed by photopolymerization by the method described below to obtain a cured polymer. To the solution were added camphorquinone (CQ) and dimethylaminoethyl methacrylate (DMAEMA) each in an amount of 0.5 wt % based on the monomer, and the mixture was irradiated with visible rays at room temperature for 10 minutes for polymerization.

The polymer material obtained was 10.0 HV (25° C.) in Vickers hardness.

The tanδ and E' values of the material were measured in the same manner as in Example 1. Table 5 shows the result.

TABLE 5

| Temp. (°C.) | tanδ | E' (dyne/cm$^2$) |
| --- | --- | --- |
| −50 | 0.030 | 2.80 × 10$^{10}$ |
| −25 | 0.035 | 2.45 × 10$^{10}$ |
| 0 | 0.047 | 2.22 × 10$^{10}$ |
| 25 | 0.063 | 1.67 × 10$^{10}$ |
| 50 | 0.30 | 0.65 × 10$^{10}$ |
| 60 | 1.35 | 2.26 × 10$^{8}$ |
| 70 | 1.55 | 2.01 × 10$^{7}$ |
| 80 | 0.71 | 3.15 × 10$^{6}$ |

TEST EXAMPLE 3

The above mixture was coated and photopolymerized in the same manner as in Test Example 1. An aluminum sheet, 0.05 mm in thickness, 30 mm in width and 200 mm in length adhered to the resin layer with use of an epoxy adhesive. The adhesive layer was up to 20 μm in thickness. Table 6 shows the results obtained by subjecting the test piece to a modal analysis.

TABLE 6

| Temp. (°C.) | Attenuation constant (%) | Frequency (Hz) |
| --- | --- | --- |
| 60 | 1.07 | 412 |
| 100 | 1.62 | 399 |
| 140 | 1.00 | 388 |

EXAMPLE 4

The same photopolymerization process as in Example 3 was practiced except that the ratio of G801 to MMA was 55:45 by weight.

The tanδ and E' values of the polymer material obtained were measured in the same manner as in Example 1. Table 7 shows the result.

TABLE 7

| Temp. (°C.) | tanδ | E' (dyne/cm$^2$) |
| --- | --- | --- |
| −150 | 0.017 | 4.3 × 10$^{10}$ |
| −100 | 0.031 | 3.7 × 10$^{10}$ |
| −50 | 0.024 | 2.9 × 10$^{10}$ |
| 0 | 0.036 | 2.2 × 10$^{10}$ |
| 50 | 0.125 | 1.02 × 10$^{10}$ |
| 60 | 0.40 | 2.0 × 10$^{8}$ |
| 100 | 1.70 | 4.1 × 10$^{6}$ |
| 150 | 1.02 | 1.1 × 10$^{6}$ |

TEST EXAMPLE 4

A test piece was prepared from the above mixture in the same manner as in Test Example 3. Table 8 shows the results obtained by subjecting the test piece to a modal analysis.

TABLE 8

| Temp. (°C.) | Attenuation constant (%) | Frequency (Hz) |
| --- | --- | --- |
| 60 | 1.06 | 398 |
| 80 | 1.35 | 391 |
| 100 | 1.27 | 384 |
| 120 | 1.05 | 375 |

EXAMPLE 5

Tetrafluoroethylene-propylene copolymer was dissolved in a monomer mixture of 5 FMA and EDMA in the proportions listed in Table 9, followed by thermal polymerization in the manner described below to obtain a cured polymer. To the solution was added 0.5 wt % of azobisisobutyronitrile (AIBN) based on the monomer, and the mixture was heated at 60° C. for 2 hours and 80° C. for 1 hour for thermal polymerization.

The polymer material obtained was 2.7 HV (25° C.) in Vickers hardness. The material was 237 kgf/cm$^2$ in tensile strength as measured by an autograph, product of Shimadzu Seisakusho, Ltd. under the conditions of crosshead speed of 100 mm/min and dumbell No. 2 sample.

Table 10 shows the result obtained by measuring the tanδ and E' values of the polymer material in the same manner as in Example 1.

TABLE 9

| Tetrafluoroethylene/ propylene (60/40) copolymer | 5 FMA | EDMA |
| --- | --- | --- |
| 33 | 50 | 17 |

TABLE 10

| Temp. (°C.) | tanδ | E' (dyne/cm$^2$) |
| --- | --- | --- |
| −50 | 0.020 | 2.0 × 10$^{10}$ |
| −25 | 0.027 | 1.88 × 10$^{10}$ |
| 0 | 0.055 | 1.70 × 10$^{10}$ |
| 7.5 | 0.134 | 1.22 × 10$^{10}$ |
| 25 | 0.082 | 0.74 × 10$^{10}$ |
| 50 | 0.087 | 0.53 × 10$^{10}$ |
| 75 | 0.130 | 0.37 × 10$^{10}$ |
| 90 | 0.300 | 0.03 × 10$^{10}$ |
| 100 | 1.45 | 6.00 × 10$^{7}$ |
| 110 | 1.37 | 3.35 × 10$^{7}$ |

TEST EXAMPLE 5

The above mixture was subjected to thermal polymerization in the same manner as in the above to obtain a film, 0.2 mm in thickness, 30 mm in width and 200 mm in length. The film was sandwiched between two steel panels, 1.6 mm in thickness, 30 mm in width and 200 mm in length. The panels were adhered to the film with the use of an epoxy adhesive. The adhesive layer was up to 20 μm in thickness. Table 11 shows the results obtained by subjecting the test piece to a modal analysis.

TABLE 11

| Temp. (°C.) | Attenuation constant (%) | Frequency (Hz) |
| --- | --- | --- |
| 19 | 6.21 | 411 |
| 40 | 17.1 | 321 |
| 60 | 15.8 | 262 |

EXAMPLE 6

Tetrafluoroethylene-propylene copolymer was dissolved in 5 FMA in the ratio given in Table 12 and subjected to thermal polymerization in the following manner to obtain a cured polymer. To the solution was added azobisisobutyronitrile (AIBN) in an amount of 0.5 wt % based on the monomer, and the mixture was heated at 60° C. for 2 hours and then at 80° C. for 1 hour for polymerization.

The polymer material obtained was 1.6 H V (25° C.) in Vickers hardness, and was 215 kgf/cm$^2$ in tensile strength as measured under the same conditions as in Example 5.

Table 13 shows the result obtained by measuring the tanδ and E' values of the material in the same manner as in Example 1.

TABLE 12

| Tetrafluorethylene/propylene (60/40) copolymer | 5 FMA |
|---|---|
| 37 | 63 |

TABLE 13

| Temp. (°C.) | tanδ | E' (dyne/cm$^2$) |
|---|---|---|
| −50 | 0.007 | 2.25 × 10$^{10}$ |
| −25 | 0.010 | 1.95 × 10$^{10}$ |
| 0 | 0.072 | 1.32 × 10$^{10}$ |
| 10 | 0.360 | 4.0 × 10$^9$ |
| 25 | 0.143 | 1.85 × 10$^9$ |
| 50 | 0.210 | 1.3 × 10$^9$ |

TEST EXAMPLE 6

A test piece was prepared from the above mixture in the same manner as in Test Example 5. Table 14 shows the results obtained by subjecting the test piece to a modal analysis.

TABLE 14

| Temp. (°C.) | Attenuation constant (%) | Frequency (Hz) |
|---|---|---|
| 40 | 2.3 | 375 |
| 60 | 11.0 | 305 |
| 80 | 3.5 | 259 |

EXAMPLE 7

Dai-el ® G801 (iodine-containing vinylidene fluoride elastic copolymer) and acrylic resin (homopolymer of ethyl methacrylate) in the ratio of 1:1 by weight were dissolved in ethyl acetate, followed by stirring for 24 hours. The solution obtained was cast into a film of polymer. The polymer material thus prepared was 63 HDA in Shore hardness.

Table 15 shows the result obtained by measuring the tanδ and E' values of the material in the same manner as in Example 1.

TABLE 15

| Temp. (°C.) | tanδ | E' (dyne/cm$^2$) |
|---|---|---|
| −100 | 0.022 | 2.75 × 10$^{10}$ |
| −75 | 0.017 | 2.60 × 10$^{10}$ |
| −50 | 0.026 | 2.25 × 10$^{10}$ |
| −25 | 0.078 | 1.85 × 10$^{10}$ |
| 0 | 0.205 | 1.03 × 10$^{10}$ |
| 25 | 0.910 | 1.05 × 10$^9$ |
| 40 | 1.050 | 0.73 × 10$^9$ |
| 50 | 0.89 | 6.10 × 10$^8$ |
| 60 | 0.62 | 5.81 × 10$^8$ |

Test Example 7

The above mixture was made into a film, 0.2 mm in thickness, 30 mm in width and 200 mm in length. The film was sandwiched between two steel panels, 1.6 mm in thickness, 30 mm in width and 200 mm in length. The panels adhered to the film with use of an epoxy adhesive. The adhesive layer was up to 20 μm in thickness. Table 16 shows the results obtained by subjecting the test piece to a modal analysis.

TABLE 16

| Temp. (°C.) | Attenuation constant (%) | Frequency (Hz) |
|---|---|---|
| 60 | 13.3 | 265 |
| 80 | 18.5 | 235 |
| 100 | 18.0 | 217 |

Example 8

Tetrafluoroethylene/propylene (60/40, mole %) copolymer and 4 FMA polymer in the ration of 67:33 by weight were dissolved in a fluorine-containing solvent, i.e., CF$_2$Cl—CF$_2$Cl, followed by stirring for 24 hours. The solution obtained was dried in a vacuum at 45° C. to obtain a transparent film, 260 μm in thickness.

Table 17 shows th result obtained by measuring the tanδ and E' values of the polymer material thus prepared.

TABLE 17

| Temp. (°C.) | tanδ | E' (dyne/cm$^2$) |
|---|---|---|
| −100 | 0.038 | 1.95 × 10$^{10}$ |
| −80 | 0.026 | 1.70 × 10$^{10}$ |
| −60 | 0.015 | 1.55 × 10$^{10}$ |
| −40 | 0.016 | 1.40 × 10$^{10}$ |
| −20 | 0.056 | 1.10 × 10$^{10}$ |
| −10 | 0.270 | 0.52 × 10$^{10}$ |
| 0 | 0.52 | 0.95 × 10$^9$ |
| 10 | 0.38 | 0.11 × 10$^9$ |
| 20 | 0.26 | 0.07 × 10$^9$ |

Test Example 8

The above film was subjected to a modal analysis in the same manner as in Test Example 7. The results are given in Table 18.

TABLE 18

| Temp. (°C.) | Attenuation constant (%) | Frequency (Hz) |
|---|---|---|
| 19 | 2.1 | 419 |
| 40 | 8.2 | 328 |
| 60 | 11.5 | 275 |

Example 9

Polyvinylidene fluoride and acrylic resin (homopolymer of ethyl methacrylate) were blended in a molten state at 200° C. in the ratio of 2:1 by weight and then quenched to prepare a film having a thickness of 100 μm. The polymer material obtained was 5.1 HV (25° C.) in Vickers hardness.

Table 19 shows the tanδ and E' values of the material measured in the same manner as in Example 1.

TABLE 19

| Temp. (°C.) | tanδ | E' (dyne/cm$^2$) |
|---|---|---|
| −50 | 0.012 | 8.4 × 10$^{10}$ |
| −25 | 0.022 | 6.8 × 10$^{10}$ |
| 0 | 0.054 | 4.7 × 10$^{10}$ |
| 25 | 0.158 | 2.45 × 10$^{10}$ |
| 50 | 0.250 | 0.81 × 10$^{10}$ |
| 75 | 0.160 | 0.38 × 10$^{10}$ |
| 100 | 0.115 | 0.26 × 10$^{10}$ |

Test Example 9

The above film was subjected to a modal analysis in the same manner as in Test Example 7. The results are given in Table 20.

TABLE 20

| Temp. (°C.) | Attenuation constant (%) | Frequency (Hz) |
|---|---|---|
| 60 | 2.8 | 267 |
| 80 | 5.0 | 236 |
| 100 | 7.6 | 218 |
| 120 | 5.4 | 211 |

Example 10

Polyvinylidene fluoride and acrylic resin (homopolymer of ethyl methacrylate) in the ratio of 1:1 by weight were dissolved in dimethylformamide, followed by stirring for 24 hours. The solution was cast into a film of polymer. The polymer material obtained was 7.4 HV (25° C.) in Vickers hardness.

Table 21 shows the tan$\delta$ and E' values of the material measured in the same manner as in Example 1.

TABLE 21

| Temp. (°C.) | tan$\delta$ | E' (dyne/cm$^2$) |
|---|---|---|
| −50 | 0.020 | $3.5 \times 10^{10}$ |
| −25 | 0.046 | $2.55 \times 10^{10}$ |
| 0 | 0.128 | $1.40 \times 10^{10}$ |
| 25 | 0.380 | $4.58 \times 10^{9}$ |
| 43 | 0.610 | $0.98 \times 10^{9}$ |
| 50 | 0.580 | $0.57 \times 10^{9}$ |
| 75 | 0.330 | $0.05 \times 10^{9}$ |
| 100 | 0.200 | $0.32 \times 10^{7}$ |

Test Example 10

The above film was subjected to a modal analysis in the same manner as in Test Example 7. The results are given in Table 22.

TABLE 22

| Temp. (°C.) | Attenuation constant (%) | Frequency (Hz) |
|---|---|---|
| 80 | 13.3 | 238 |
| 100 | 15.4 | 217 |
| 120 | 12.0 | 212 |

Example 11

In 30 g of methyl acrylate (MAc) were dissolved CQ and DMAEMA each in an amount of 0.5 wt % based on the MAc. Firther dissolved in the solution were 70 g of G801, and Perhexa 2.5 B and TAIC in amounts of 1.5 wt % and 4 wt %, respectively, based on the G801 to prepare a uniform solution, which was irradiated with visible rays to effect photopolymerization. The sample obtained was heat-treated at 160° C. for 10 minutes to crosslink the rubber. Table 23 shows the result obtained by measuring the tan$\delta$ and E' values of the polymer material prepared in the same manner as in Example 1.

TABLE 23

| Temp. (°C.) | tan$\delta$ | E' (dyne/cm$^2$) |
|---|---|---|
| 0.7 | 0.14 | $1.17 \times 10^{10}$ |
| 10.7 | 0.43 | $6.95 \times 10^{9}$ |
| 16.7 | 1.32 | $2.16 \times 10^{9}$ |
| 20.7 | 2.13 | $7.13 \times 10^{8}$ |
| 24.7 | 2.05 | $3.27 \times 10^{8}$ |
| 28.7 | 1.48 | $2.53 \times 10^{8}$ |
| 32.8 | 1.20 | $2.39 \times 10^{8}$ |
| 36.7 | 0.96 | $2.44 \times 10^{8}$ |

Test Example 11

The above mixture was photopolymerized. A test piece was obtained in the same manner as in Test Example 7. Table 24 shows the results obtained by subjecting the test piece to a modal analysis.

TABLE 24

| Temp. (°C.) | Attenuation constant (%) | Frequency (Hz) |
|---|---|---|
| 60 | 13.1 | 239 |
| 80 | 19.2 | 214 |
| 100 | 13.8 | 213 |

Example 12

A test piece was obtained in the same manner as in Example 11 except that a monomer mixture of MAc (29 g) and 1 G (1 g) was used in place of MAc (30 g). Table 25 shows the result obtained by measuring the tan$\delta$ and E' values of the polymer material prepared in the same manner as in Example 1.

TABLE 25

| Temp. (°C.) | tan$\delta$ | E' (dyne/cm$^2$) |
|---|---|---|
| 0.7 | 0.14 | $1.15 \times 10^{10}$ |
| 10.7 | 0.44 | $6.93 \times 10^{9}$ |
| 16.7 | 1.33 | $2.17 \times 10^{9}$ |
| 20.7 | 2.10 | $7.14 \times 10^{8}$ |
| 24.7 | 2.03 | $3.35 \times 10^{8}$ |
| 28.7 | 1.47 | $2.60 \times 10^{8}$ |
| 32.8 | 1.23 | $2.45 \times 10^{8}$ |
| 36.7 | 0.99 | $2.47 \times 10^{8}$ |

Test Example 12

A test piece was prepared from the above mixture in the same manner as in Test Example 11. Table 26 shows the results obtained by subjecting the test piece to a modal analysis.

TABLE 26

| Temp. (°C.) | Attenuation constant (%) | Frequency (Hz) |
|---|---|---|
| 80 | 13.1 | 239 |
| 100 | 15.2 | 218 |
| 120 | 11.8 | 214 |

EXAMPLE 13

In a monomer mixture of 27 g of i-butyl acrylate (i-BuAc) and 3 g of 1 G were dissolved CQ and DMAEMA each in an amount of 0.5 wt. % based on the monomer mixture. Further dissolved in the solution were 70 g of G801 to prepare a uniform solution, which was irradiated with visible rays to effect photopolymerization. Table 27 shows the result obtained by measuring the tan$\delta$ and E' values of the polymer material prepared in the same manner as in Example 1.

TABLE 27

| Temp. (°C.) | tan$\delta$ | E' (dyne/cm$^2$) |
|---|---|---|
| 0.8 | 1.32 | $7.4 \times 10^{8}$ |
| 4.7 | 1.71 | $3.92 \times 10^{8}$ |
| 6.7 | 1.71 | $3.70 \times 10^{8}$ |
| 10.7 | 1.43 | $3.20 \times 10^{8}$ |
| 16.7 | 1.07 | $3.30 \times 10^{8}$ |

TEST EXAMPLE 13

A test piece was prepared from the above mixture in the same manner as in Test Example 11. Table 28 shows the results obtained by subjecting the test piece to a modal analysis.

TABLE 28

| Temp. (°C.) | Attenuation constant (%) | Frequency (Hz) |
|---|---|---|
| 40 | 13.3 | 237 |
| 70 | 18.5 | 216 |
| 80 | 15.1 | 215 |

EXAMPLE 14

In 30 g of i-butyl acrylate (i-BuAc) were dissolved CQ and DMAEMA each in an amount of 0.5 wt % based on the i-BuAc. Further dissolved in the solution were 70 g of G801 to prepare a uniform solution, which was irradiated with visible rays to effect photopolymerization. Table 29 shows the result obtained by measuring the $tan\delta$ and $E'$ values of the polymer material prepared in the same manner as in Example 1.

TABLE 29

| Temp. (°C.) | $tan\delta$ | $E'$ (dyne/cm$^2$) |
|---|---|---|
| 0.8 | 1.31 | $7.3 \times 10^8$ |
| 4.7 | 1.70 | $3.85 \times 10^8$ |
| 6.7 | 1.75 | $3.63 \times 10^8$ |
| 10.7 | 1.45 | $3.15 \times 10^8$ |
| 16.7 | 1.09 | $3.21 \times 10^8$ |

TEST EXAMPLE 14

A test piece was prepared from the above mixture in the same manner as in Test Example 11. Table 30 shows the results obtained by subjecting the test piece to a modal analysis.

TABLE 30

| Temp. (°C.) | Attenuation constant (%) | Frequency (Hz) |
|---|---|---|
| 40 | 13.5 | 238 |
| 60 | 18.3 | 215 |
| 80 | 14.9 | 214 |

EXAMPLE 15

In 30 g of methyl methacrylate (MMA) were dissolved CQ and DMAEMA each in an amount of 0.5 wt % based on the MMA. Further dissolved in the solution were 70 g of G912 to prepare a uniform solution, which was irradiated with visible rays to effect photopolymerization. Table 31 shows the result obtained by measuring the $tan\delta$ and $E'$ values of the polymer material prepared in the same manner as in Example 1. G912 is a polymer of three components, namely tetrafluoroethylene, vinylidene fluoride and hexafluoropropylene.

TABLE 31

| Temp. (°C.) | $tan\delta$ | $E'$ (dyne/cm$^2$) |
|---|---|---|
| 50 | 0.25 | $0.88 \times 10^{10}$ |
| 60 | 1.15 | $3.20 \times 10^8$ |
| 70 | 1.50 | $2.21 \times 10^7$ |
| 80 | 0.91 | $3.10 \times 10^6$ |

TEST EXAMPLE 15

A test piece was prepared from the above mixture in the same manner as in Test Example 3. Table 32 shows the results obtained by subjecting the test piece to a modal analysis.

TABLE 32

| Temp. (°C.) | Attenuation constant (%) | Frequency (Hz) |
|---|---|---|
| 60 | 1.08 | 411 |
| 100 | 1.59 | 400 |
| 140 | 1.01 | 387 |

EXAMPLE 16

G801 and PMMA in the ratio of 1:1 by weight were dissolved in acetylacetone, followed by stirring for 24 hours. The solution was cast into a film of polymer. Table 33 shows the $tan\delta$ and $E'$ values of the material measured in the same manner as in Example 1.

TABLE 33

| Temp. (°C.) | $tan\delta$ | $E'$ (dyne/cm$^2$) |
|---|---|---|
| 30 | 0.51 | $3.0 \times 10^9$ |
| 40 | 0.84 | $3.7 \times 10^8$ |
| 50 | 1.0 | $1.5 \times 10^7$ |
| 60 | 0.92 | $8.0 \times 10^6$ |
| 70 | 0.66 | $5.5 \times 10^6$ |

TEST EXAMPLE 16

The above film was subjected to a modal analysis in the same manner as in Test Example 7. The results are given in Table 34.

TABLE 34

| Temp. (°C.) | Attenuation constant (%) | Frequency (Hz) |
|---|---|---|
| 80 | 14.3 | 229 |
| 100 | 18.9 | 217 |
| 120 | 16.3 | 209 |

EXAMPLE 17

Fifty five parts by weight of Dai-el® G801 was dissolved in 45 parts of MMA having dissolved therein CQ and DMAEMA each in an amount of 0.5 wt %. The solution was applied to a steel panel, 200×30×3 mm in a thickness of 2.5 mm, and the coating was polymerized with the irradiation of visible rays.

The above resin layer was further coated with a mixture of G801/MMA/1 G (110/45/45) to a thickness of 1 mm and over an area of 30 mm in width and 200 mm in length, and the coating was irradated with light for polymerization. Table 35 shows the result achieved by subjecting the test piece obtained by a modal analysis.

TABLE 35

| Temp. (°C.) | Attenuation constant (%) | Frequency (Hz) |
|---|---|---|
| 60 | 1.19 | 400 |
| 80 | 1.23 | 391 |
| 100 | 0.79 | 385 |

EXAMPLE 18

Dai-el G801 was dissolved in an acrylic monomer having CQ and DMAEMA dissolved therein each in an amount of 0.5 wt % so that the resulting solution contained 70 wt % of G801 and 30 wt % of the acrylic monomer and the initiator combined. The solution was pressed as sandwiched between two glass plates, 1 mm in thickness and 120 mm in length and width, and thereafter irradiated with visible light for polymerization. Table 36 shows the result achieved by subjecting the sample obtained to a modal analysis at 25° C.

TABLE 36

| Acrylic monomer | Resin layer thickness (μm) | Attenuation constant (%) | Frequency (Hz) |
| --- | --- | --- | --- |
| EtMA | 260 | 0.52 | 547 |
| EtAc | 270 | 13.2 | 540 |
| n-BuMA | 280 | 1.8 | 524 |
| n-BuAc | 320 | 20.3 | 453 |
| MMA | 270 | 2.6 | 542 |
| i-PrMA | 270 | 0.5 | 546 |

COMPARATIVE EXAMPLE 1

Table 37 shows attenuation constant of the steel panel used in examples.

TABLE 37

| Steel panel (mm) | | | Attenuation constant (%) | Frequency (Hz) |
| --- | --- | --- | --- | --- |
| Thickness | Width | Length | | |
| 3 | 30 | 200 | 0.43 | 394 |
| 1.6 | 30 | 200 | 0.49 | 547 |

TEST EXAMPLE 17

There are two characteristics required of vibration-proof rubber: increased loss tangent (tanδ) and decreased magnification (dynamic spring constant/static shear elastic modulus).

The vibration-proof characteristics of the samples of Examples were evaluated in terms of loss tangent (tanδ) at 25° C., 11 Hz and complex elastic modulus (E*) at 25° C., 110 Hz which were determined using a viscoelasticity spectrometer (product of Orientec Co., Ltd.), and magnification, E*/Es, wherein Es is a static elastic modulus determined from the static shear modulus (Gs) according to JIS K6301.

The sample of Example 14 was 0.629 in tanδ and 1.70 in magnification as determined in the above manner.

WEATHER-RESISTANCE TEST

To 3 g of MMA was dissolved 7 g of G801 and the monomer was polymerized in the same manner as in Example 3. The obtained cured polymer was checked for weather-resistance by measuring gloss of a sample after weather-resistance promoting test. Test conditions are given in Table 38.

| Eyesuper UV tester [SUV-W13, Iwasaki Electronic Co., Ltd.] | |
| --- | --- |
| Lamp illuminance | 100 mW/cm$^2$ |
| Cycle | 96 hr/time |

TABLE 38

| Kind of test | Temp. | Humidity |
| --- | --- | --- |
| Light | 6 hr. | 63° C. | 70% |
| Dew | 5 hr. | 30° C. | 100% |
| Rest | 1 hr. | 63° C. | 70% |

GLOSS TEST

The sample after the above weather-resistance test was checked for 60° specular gloss with use of a degital variable glossmeter [UGV-5D, product of Suga Test Instruments Co., Ltd.]. The results were shown in Table 39.

TABLE 39

| Time (hr) | 0 | 96 | 192 | 288 | 384 |
| --- | --- | --- | --- | --- | --- |
| Gloss | 451.0 | 463.6 | 454.5 | 464.9 | 470.5 |

We claim:
1. A polymer composition for vibration-proof damping obtained by dissolving an amorphous fluorine-containing polymer in an acrylic monomer, and polymerizing the monomer with or without permitting the resulting polymer to form an interpenetrating polymer network,
   wherein the amorphous fluorine-containing polymer is selected from the group consisting of fluoroalkene/olefin copolymer, fluoro(alkyl vinyl ether)/olefin copolymer, fluorosilicon elastomer and fluorophosphazene elastomer.
2. A polymer composition as defined in claim 1 wherein the acrylic monomer is mono-functional.
3. A polymer composition as defined in claim 1 wherein the acrylic monomer is poly-functional.
4. A polymer composition for vibration-proof damping obtained by dissolving an amorphous fluorine-containing polymer in a monomer mixture consisting of acrylic monomer and a monomer copolymerizable with said acrylic monomer, and polymerizing the monomer mixture with or without permitting the resulting copolymer to form an interpenetrating copolymer network,
   wherein the amorphous fluorine-containing polymer is selected from the group consisting of fluoroalkene/olefin copolymer, fluoro(alkyl vinyl ether)/olefin copolymer, fluorosilicon elastomer and fluorophosphazene elastomer.

* * * * *